UNITED STATES PATENT OFFICE.

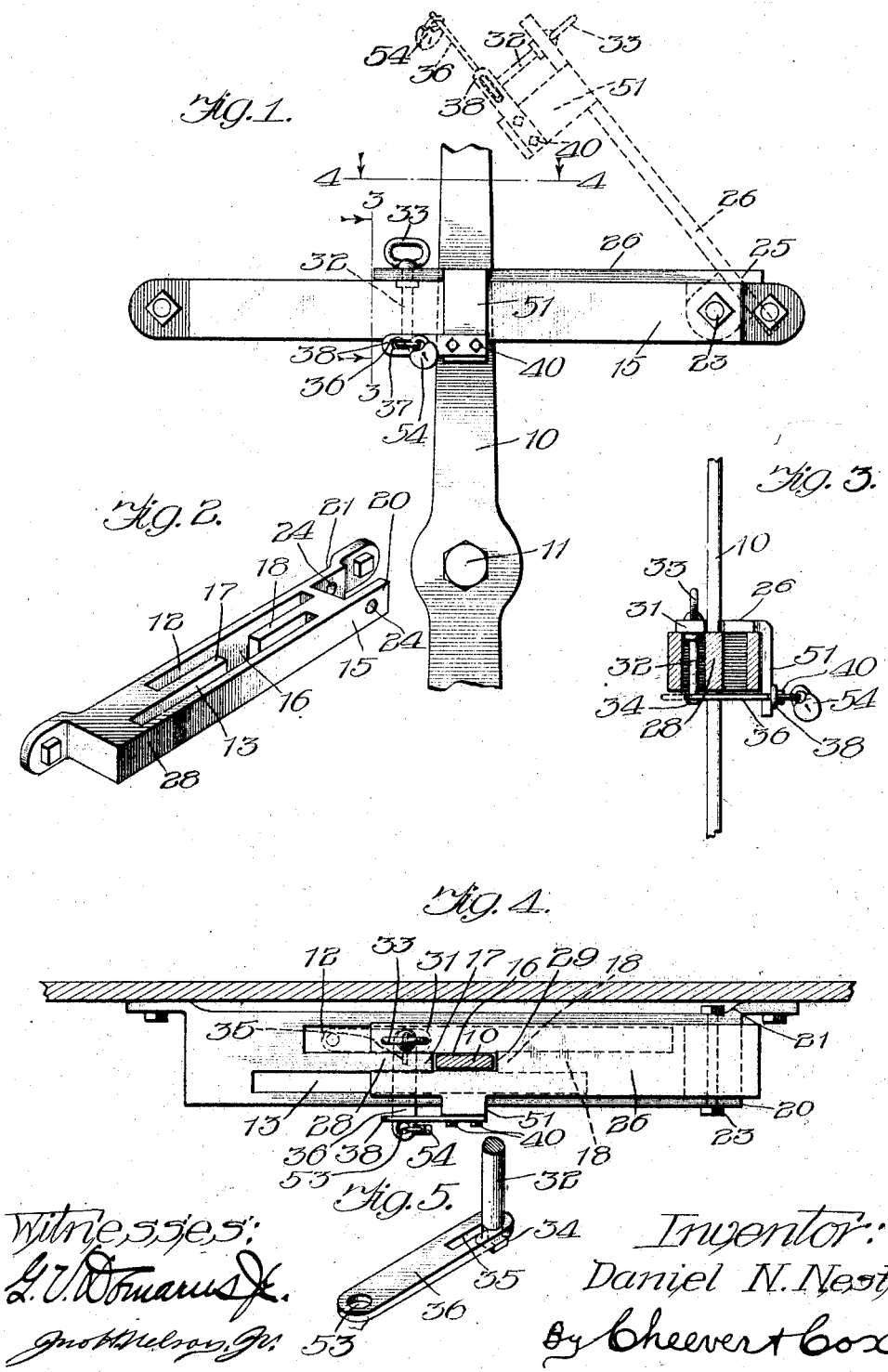

DANIEL N. NESTER, OF CHICAGO, ILLINOIS.

AUTOMOBILE-LEVER LOCK.

No. 929,783.  Specification of Letters Patent.  Patented Aug. 3, 1909.

Application filed October 14, 1908. Serial No. 457,715.

*To all whom it may concern:*

Be it known that I, DANIEL N. NESTER, a citizen of the United States, residing at Chicago, in the county of Cook and State of Illinois, have invented a certain new and useful Improvement in Automobile-Lever Locks, of which the following is a specification.

This invention relates to devices for locking the operating lever of an engine such primarily as that used upon an ordinary automobile so that the owner or user thereof may leave the device standing in public without fear of theft of the machine or mechanical difficulties arising from an inexperienced person attempting to operate the machine by moving the lever.

The invention consists in mechanism which can be easily and cheaply made and installed capable of moving to two different positions in one position engaging the lever on all sides so that it can not be moved in any direction and in the other position leaving said lever clear and free to be moved in any direction for the purpose of operating the machine.

The invention also consists in details of construction which will be hereafter more fully described and claimed as the specification proceeds.

Referring to the drawings, Figure 1 is a side view illustrating mechanism showing the preferred form of this device. Fig. 2 is a perspective view of the framework in which the lever to be locked slides. Fig. 3 is a sectional end view on the line 3—3 of Fig. 1. Fig. 4 is a plan view on the line 4—4 of Fig. 1. Fig. 5 is a detail view showing the method of connecting one of the locking levers to the operating post therefor.

While any sort of a lever may be locked by the device of this invention the drawings herein show an automobile engine lever 10 of a common type pivoted at 11 and adapted to be moved selectively in either the slots 12 or 13 formed in the guide frame 15, said lever when not in use normally resting in the space 16 between the members 17 and 18, the lever being so mounted that it may be moved perpendicular to the plane of Fig. 1 through the openings 16 from space 13 to space 12 and back again. This part of the mechanism thus far described is well known in the art and forms no part of this invention and is here illustrated simply for the purpose of showing how the device of this invention may be applied thereto. At one end of this main frame 15 of the device are two lugs 20 and 21 between which is journaled or pivoted on the pin 23 passing through the holes 24 a depending member 25 upon a flat board like member 26 of substantially the width of the member 15. As best seen in Fig. 4 this lever member 26 has in its end an elongated parallel sided notch 28 lying in the horizontal plane of the opening 16 in the main frame member 15. The inner end 29 of this notch 28 is so located that when the lever 26 is in the full line position of Figs. 1 and 4 it is directly over the end of the member 18 adjacent to the space 16 or is in other words in substantial contact with one face of the lever 10. This notch 28 is also so located that in the last mentioned position the sides of the notch are in substantial contact with the sides of the lever 10 when in the opening 16 heretofore described. In other words the forks adjacent to this notch 28 engage this lever 10 and hold it within the opening 16 to prevent its moving into either slot 12 or slot 13.

For the double purpose of preventing the lifting of the member 26 when in locked position and also for inclosing the fourth side of the lever 10 adjacent to the end of the member 17 when in the position just described the following mechanism is provided:—Pivoted in the fork member 31 adjacent to the notch 28 is a rod or shaft 32 carrying at its upper end a suitable handle 33 by which it may be rotated by the hand of the operator. On the lower end of this rod 32 is a non circular preferably square member 34 passing through an elongated slot 35 in a pivoted member 36. This member 36 is of such a length that it just extends across the underside of frame 15 and through a suitable opening 37 in a stationary member 38 suspended from the frame of the machine in any suitable manner in the case here shown by means of the bolts 40 and the depending member 51. In the end of this pivoted member 36 is a hole 53 through which a pad lock 54 is inserted.

In the operation of this mechanism the lever is locked by placing the parts in the position shown in Figs. 1, 3 and 4. When it is desired to use the machine which is locked by this mechanism the operator first removes the pad lock 54 then takes hold of the member 36 and slides it on the non circular portion 34 inward until it clears the member 38 after which he takes hold of the handle 33 and rotates the mechanism to the position shown in dotted lines in Fig. 1 in which the member 36 will register with the slot 12 after which the operator takes hold of the lever 26 and lifts it with all attached parts from the full line position to the dotted line position of Fig. 1 and if desired continues the movement in a clockwise direction until it is entirely out of the way of the lever 10. He now uses the lever 10 in the ordinary manner and when he desires to lock it again moves the lever 26 in the reverse direction the member 36 passing through the slot 12 until it is below the member 15 after which the operator again rotates the handle 33 until the parts are returned to original or full line position of Fig. 1.

By the foregoing construction one lock supplies the purpose of securing the lever 26 in such a position that it can not be rotated on its axis and the lever 10 can not be moved.

The claims are:

1. In mechanism of the class described, the combination of a suitable framework or standard, an operating lever slidable in a recess therein, a locking member pivoted to said standard at one side of the operating lever, there being a notch in the locking member adapted to removably engage the operating lever and mechanism for detachably closing the open end of the notch in the locking member so that the locking lever secures the operating lever upon all sides.

2. In mechanism of the class described, a suitable standard having a slot therein, an engine operating lever slidable within said slot, a locking member pivoted to the standard at one side of the operating lever and adapted to be swung in two different positions in one such position in contact with the frame and operating lever and in the other position entirely clear of it and also of the operating lever, a second member pivoted to the locking member adapted to be swung to two different positions, one parallel to the path of travel of the operating lever, the other position transverse to the operating lever, and mechanism for locking said second member for the purpose of locking the operating lever as described.

3. A suitable frame having an elongated slot therein, an operating lever slidable in said slot, a locking member pivoted to the frame at one side of the operating lever having a notch in its end, within which the operating lever lies when the parts are in locked position and a supplemental member pivotally mounted upon one fork of the locking member adjacent to said notch adapted to be swung across said notch and mechanism for locking the supplemental member in said position across the notch of the locking lever.

4. In mechanism of the class described, the combination with a frame having an elongated slot therein, an operating lever adapted to move backward and forward within said slot, a locking member pivoted to said frame at one side of the locking member, said locking member having forked portions lying on opposite sides of the operating lever and engaging the frame when the parts are in locked position, a post pivotally mounted in the locking member extending to the opposite side of the frame from that on which the locking member normally lies, a second locking member mounted upon the end of said post which is away from the first locking member capable of being swung across the path of travel of the operating lever on the opposite side of the frame from the first locking member and means for detachably locking the second locking member in the last mentioned position.

In witness whereof, I have hereunto subscribed my name in the presence of two witnesses.

DANIEL N. NESTER.

Witnesses:
DWIGHT B. CHEEVER,
C. J. CHRISTOFFEL.